Figure 1:
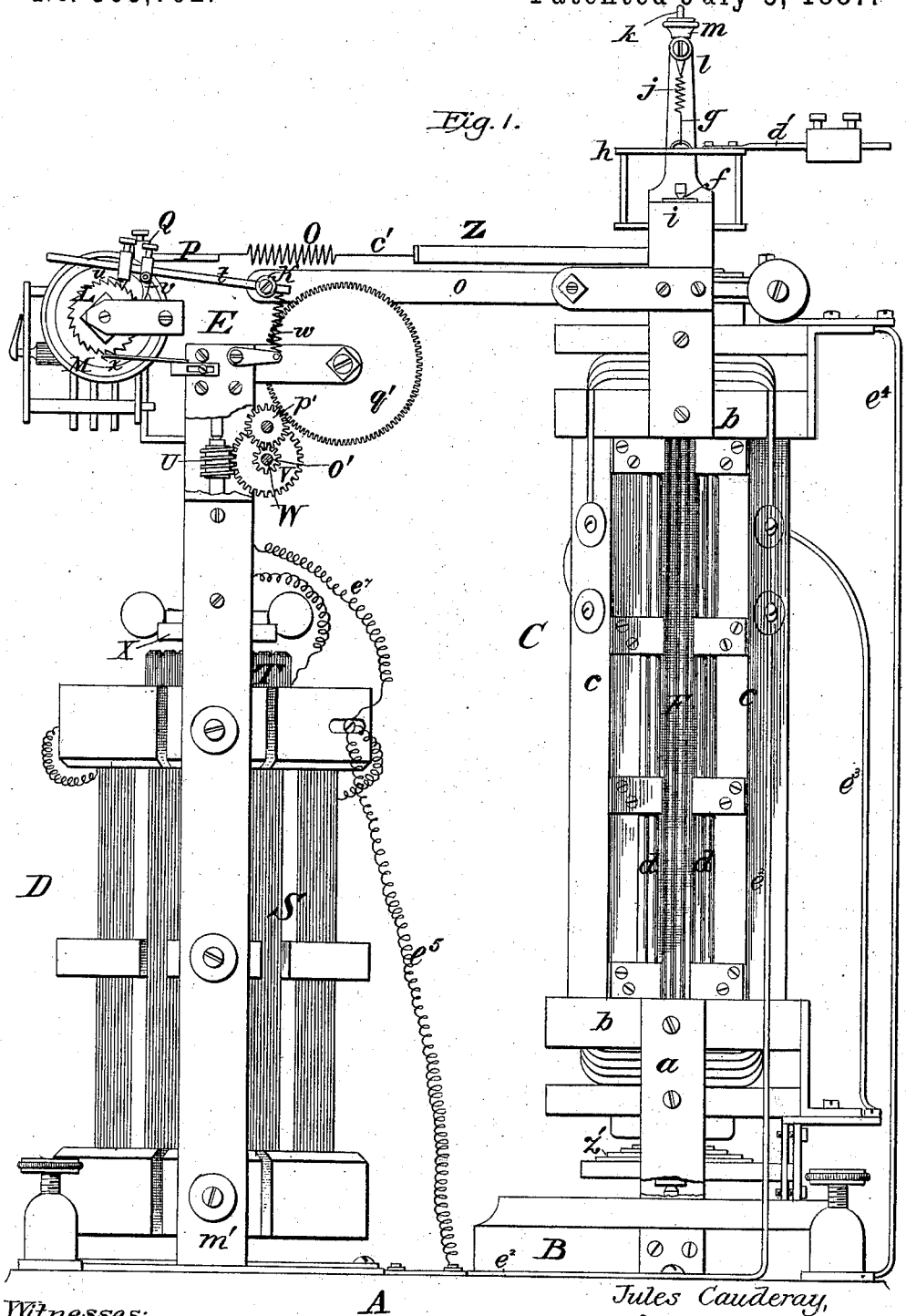

(No Model.) 9 Sheets—Sheet 3.
J. CAUDERAY.
APPARATUS FOR MEASURING ELECTRICITY.
No. 365,792. Patented July 5, 1887.
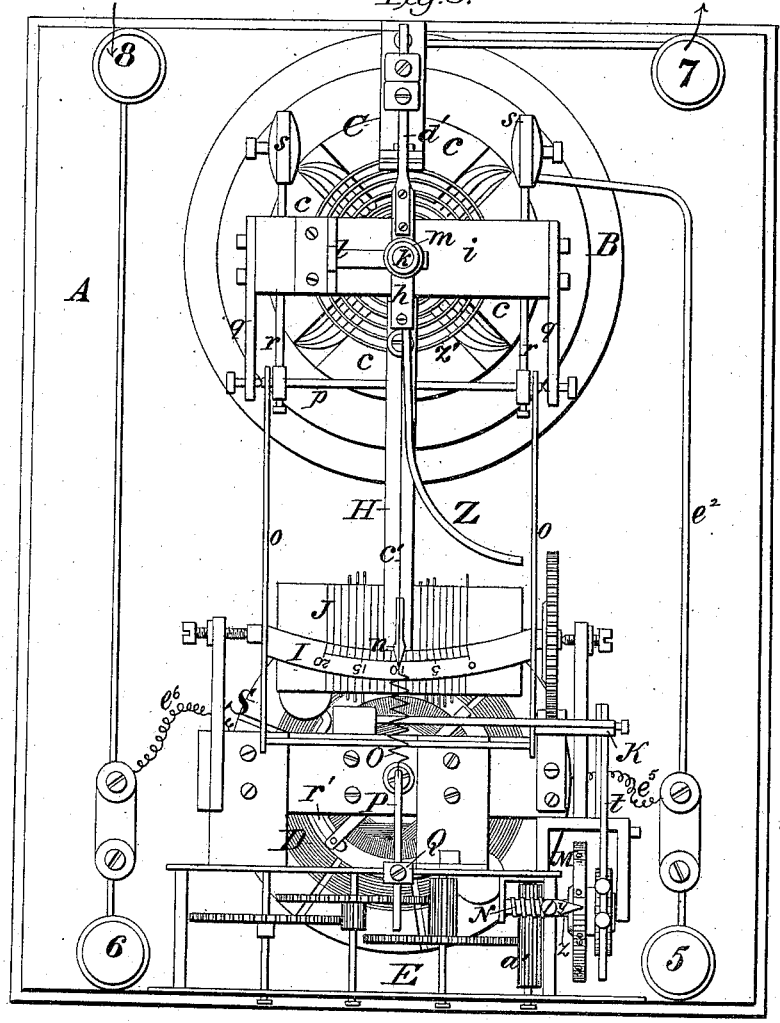
Fig. 3.
Fig. 4.
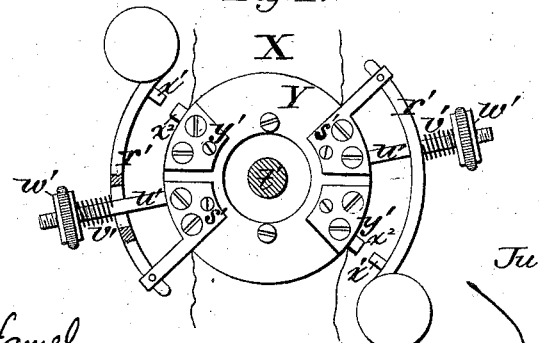
Witnesses:
James F. DuHamel
Walter A. Dodge
Jules Cauderay,
Inventor,
by Dodge & Son
his Attys.

(No Model.)  9 Sheets—Sheet 4.

J. CAUDERAY.
APPARATUS FOR MEASURING ELECTRICITY.

No. 365,792. Patented July 5, 1887.

Witnesses:
James F. DuHamel
Walter A. Dodge

Jules Cauderay,
Inventor,
by Dodge & Son
his Attys.

(No Model.) 9 Sheets—Sheet 5.
J. CAUDERAY.
APPARATUS FOR MEASURING ELECTRICITY.
No. 365,792. Patented July 5, 1887.
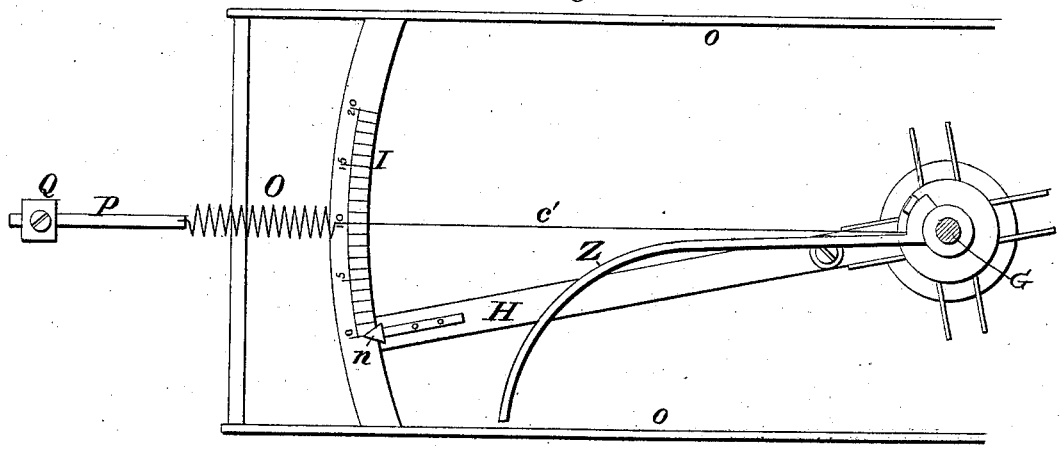
Fig. 13.
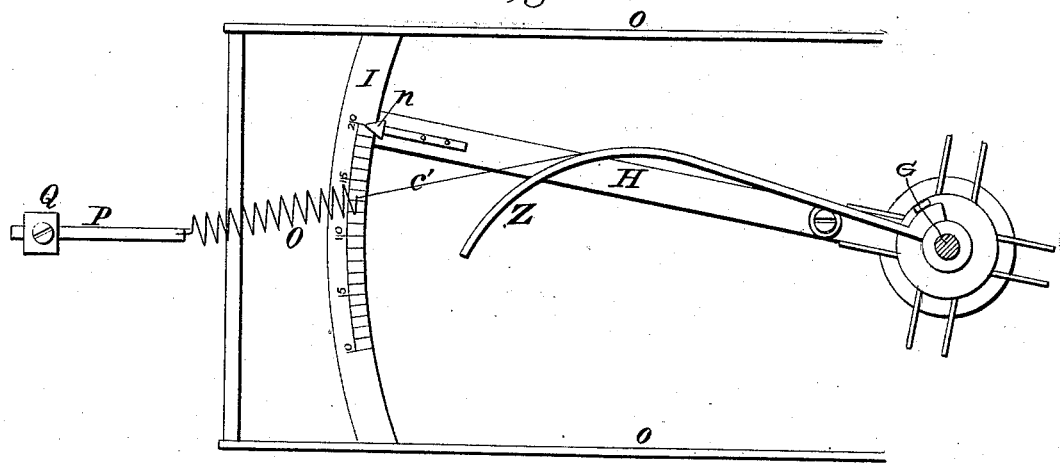
Fig. 14.
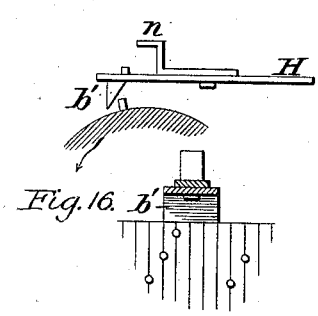
Fig. 15.
Fig. 16.
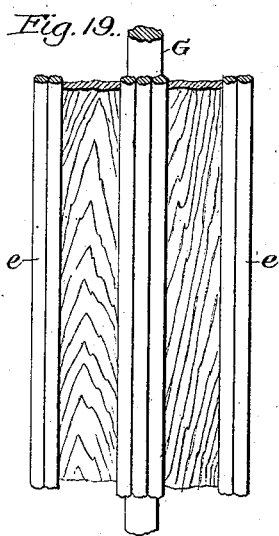
Fig. 19.
Witnesses.
James F. DuHamel
Walter S. Dodge
Jules Cauderay,
Inventor,
by Dodge & Son
his Attys.

(No Model.) 9 Sheets—Sheet 6.

J. CAUDERAY.
APPARATUS FOR MEASURING ELECTRICITY.

No. 365,792. Patented July 5, 1887.

Witnesses:
James P. DuHamel
Walter S. Dodge

Jules Cauderay,
Inventor,
by Dodge & Son,
his Attys.

(No Model.) 9 Sheets—Sheet 7.

J. CAUDERAY.
APPARATUS FOR MEASURING ELECTRICITY.

No. 365,792. Patented July 5, 1887.

Witnesses:
James F. DuHamel
Walter A. Dodge

Jules Cauderay
Inventor,
by Dodger Son,
his Attys.

(No Model.) 9 Sheets—Sheet 8.

J. CAUDERAY.
APPARATUS FOR MEASURING ELECTRICITY.

No. 365,792. Patented July 5, 1887.

Witnesses:
James F. DuHamel
Walter S. Dodge

Jules Cauderay,
Inventor,
by Dodge & Son,
his Attys.

(No Model.) 9 Sheets—Sheet 9.

J. CAUDERAY.
APPARATUS FOR MEASURING ELECTRICITY.

No. 365,792. Patented July 5, 1887.

Witnesses:
James P. DuHamel
Walter S. Dodge

Jules Cauderay
Inventor
by Dodge & Son,
his Attys.

UNITED STATES PATENT OFFICE.

JULES CAUDERAY, OF PARIS, FRANCE.

APPARATUS FOR MEASURING ELECTRICITY.

SPECIFICATION forming part of Letters Patent No. 365,792, dated July 5, 1887.

Application filed July 7, 1886. Serial No. 207,376. (No model.) Patented in France December 1, 1885, No. 172,629.

*To all whom it may concern:*

Be it known that I, JULES CAUDERAY, a citizen of Switzerland, residing at Paris, in the Department of the Seine, France, have invented certain new and useful Improvements in Apparatus for Measuring Electricity; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of my invention is to produce an apparatus capable of measuring the quantity of electricity supplied by an alternating current where the existence of a permanent magnetic field is not admissible. In attaining this end I make use of the well-known law of the direct attractions and repulsions taking place between the currents themselves. According to this law, first, two parallel currents of like direction attract each other; second, two parallel currents of opposite directions repel each other; third, these attractions and repulsions are directly proportional to the length of the wire and to the square of the intensity, and universally proportional to the square of the distance.

In accordance with these principles I have constructed an electro-dynamometer which, as will be seen hereinafter, differs in several important particulars from those heretofore devised.

The registering of the current is effected, as in my previous electric meters, by means of an oscillating index or pointer deflected laterally by the action of such parallel currents, and moving in close proximity to a toothed cylinder, which latter is caused to rotate continuously at a uniform rate of speed representing the unit of time, and the teeth of which serve to lift the oscillating index or pointer, and through the latter to actuate a pawl-and-ratchet mechanism, which gives motion to the register-train and its indices. The rotation of the toothed cylinder is effected and accurately regulated by a small dynamometric motor provided with a governor which alternately and automatically breaks or closes the circuit as the strength of the inner current requires.

Figure 2:
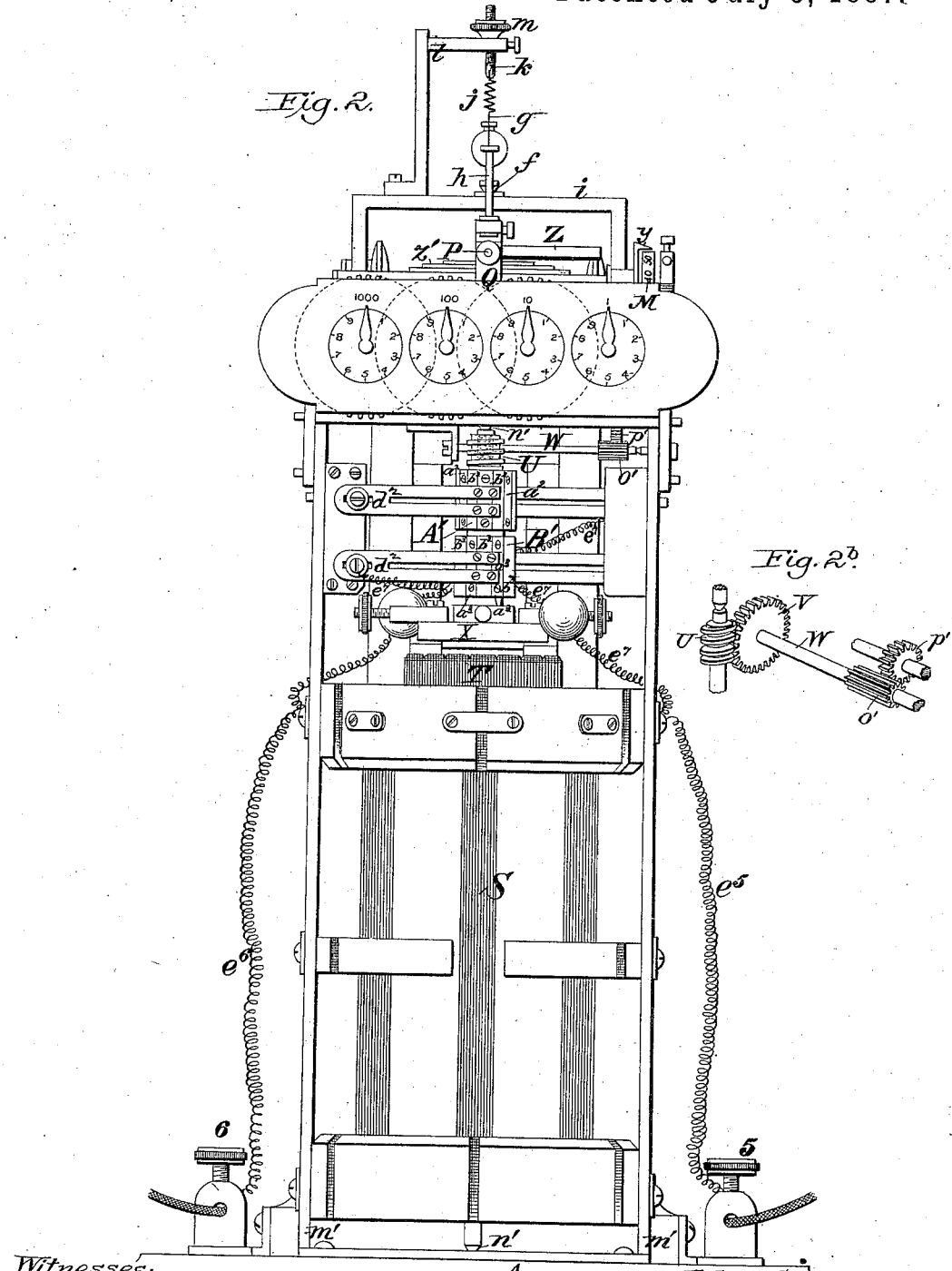
Figure 21:
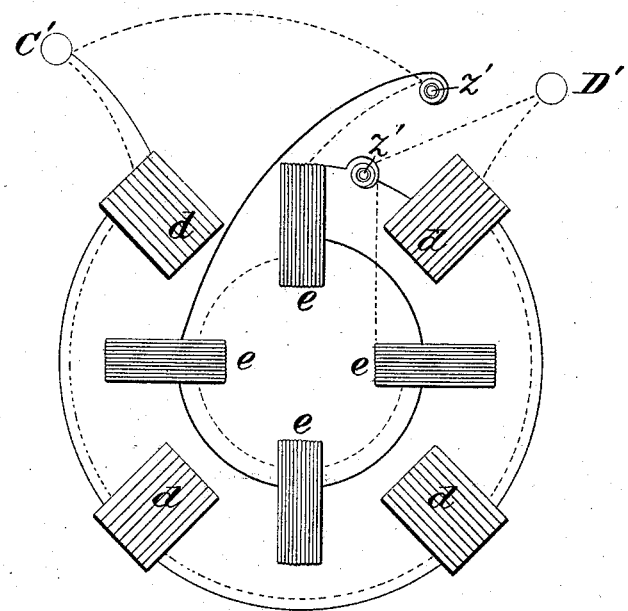
Figure 22:
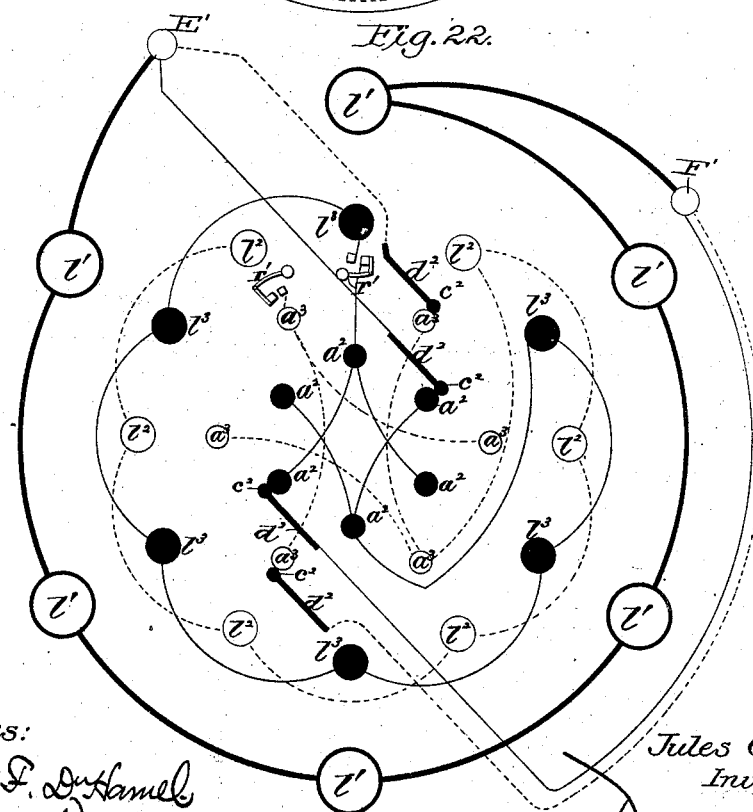
Figure 23:
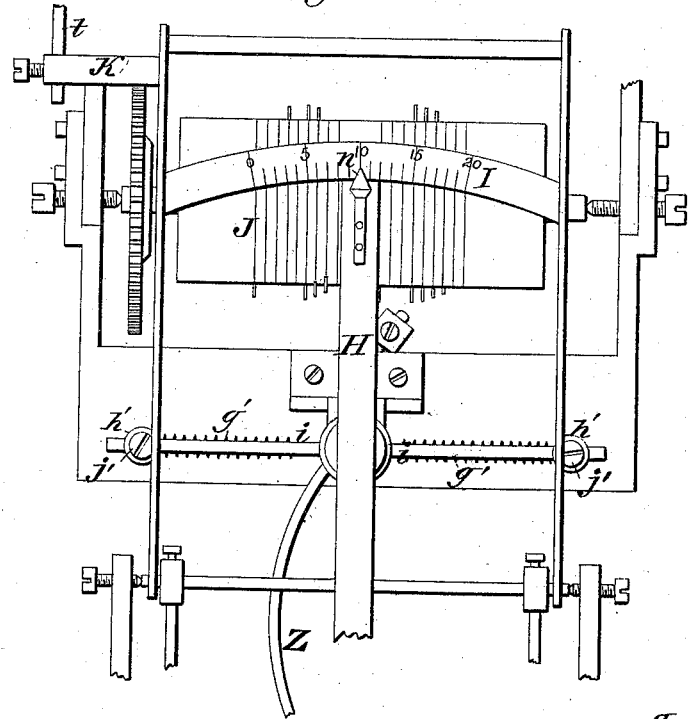

In the drawings hereto annexed, Figure 1 is a side elevation of the whole machine; Fig. 2, a front view of the apparatus; Fig. $2^b$, a detail view showing a portion of the gearing connecting the motor and the register-train; Fig. 3, a top plan view of the same; Figs. 4 to 12, inclusive, detached views showing the construction of the registering mechanism; Figs. 13 to 20, inclusive, detached views illustrating the construction of the electro-dynamometer. Fig. 21 is a diagram indicating the course of the currents of the dynamometer; Fig. 22, a diagram showing the currents of the registering mechanism; Figs. 23 to 27, detached views of various parts.

Referring now to Figs. 1, 2, and 3, which show the general construction and arrangement of the complete apparatus, A indicates a base-board or platform upon which the apparatus is mounted, and B a block or base secured upon the bed and serving to support the dynamometer C.

D indicates the electromotor by which the registering mechanism E is actuated through intermediate devices, which will be described farther on.

Figure 17:
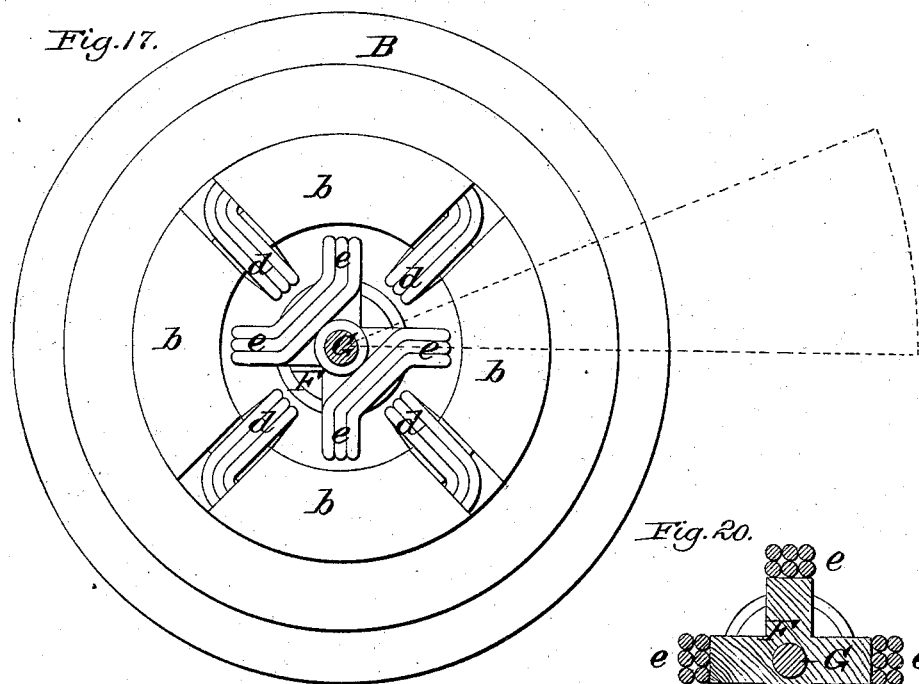
Figure 20:
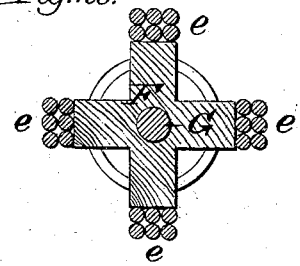
Figure 18:
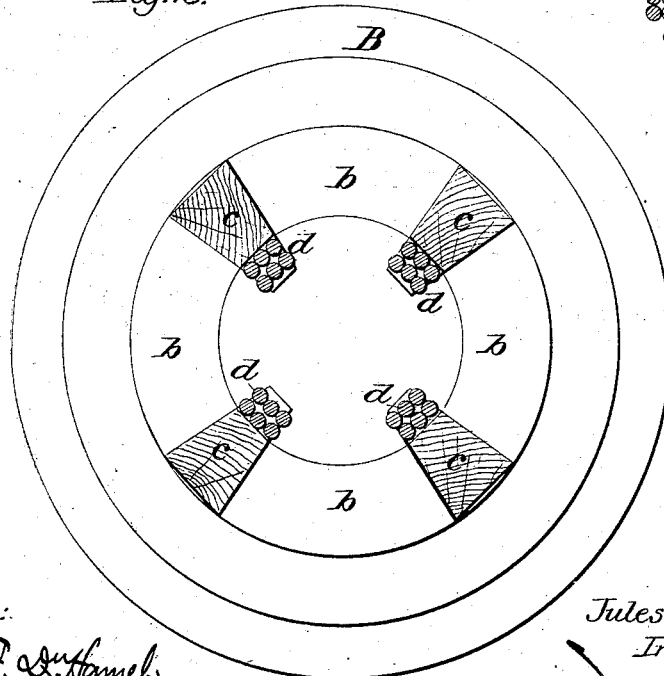

From the base or block B rise two brass standards, $a$, which support a wooden frame composed of two wooden hoops or rings, $b$ $b$, connected by four wooden bars or columns, $c$ $c$, which columns are separated sufficiently to leave a central space for a drum, F, the construction of which will be presently explained. Along the inner face of each column $c$ is a column of large wire, $d$, as best shown in Figs. 17 and 18, the several columns being formed of one continuous winding passing up one post and down the other, as indicated.

Within the open space formed by the separation of the posts or columns $c$ is placed the drum F, above referred to, which also consists of four posts or bars united at their backs and forming a star-shaped core, each bar of which is wound with wires $e$ of the same number and character as those of the bars of the fixed frame. The projecting columns formed by the wires of the fixed outer frame and of the inner drum extend past each other, those of the drum occupying the spaces between those of the frame, and consequently being limited in their movement by the width of said spaces. The drum F is centered and maintained in position by pivots or gudgeons $ff$ entering sockets in the ends of the drum-shaft G; but in order to prevent any undue friction upon the pivots or bearings the cylinder is suspended from above by a silk cord or thread, $g$, Figs. 1, 2, and 24.

Figure 24:
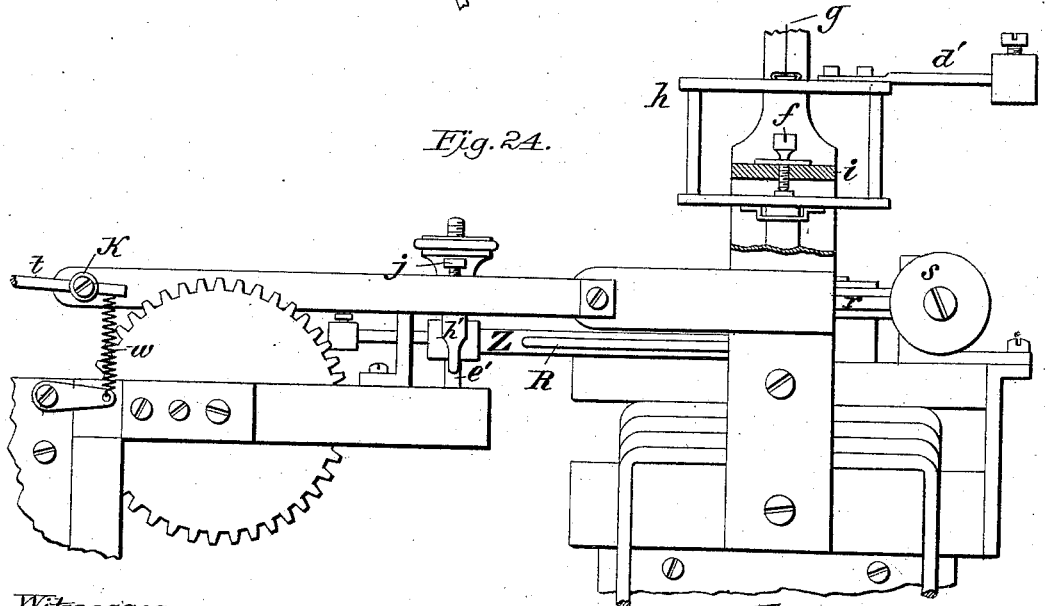
Figure 25:
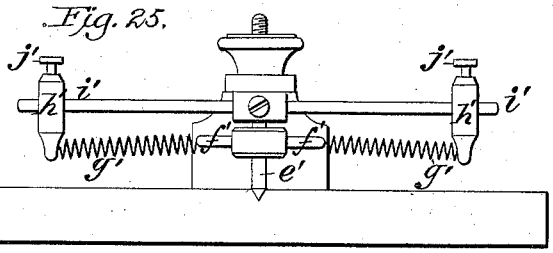
Figure 26:
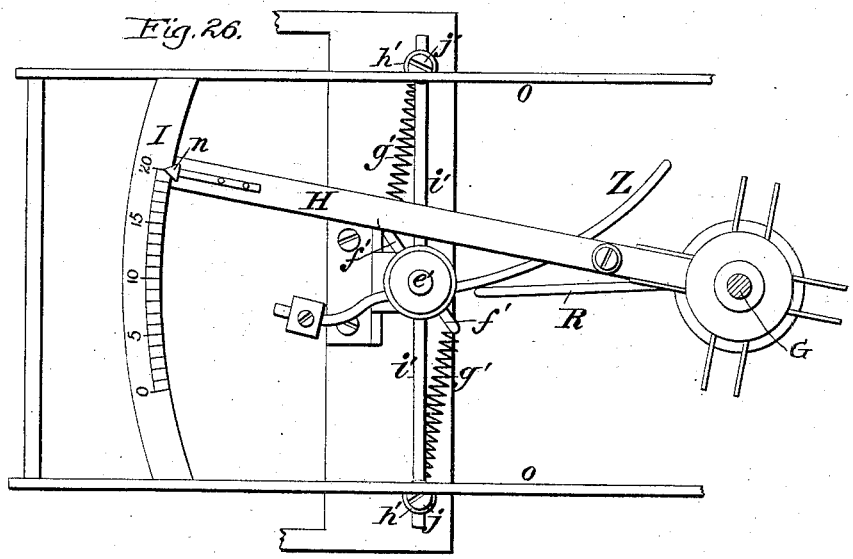
Figure 27:
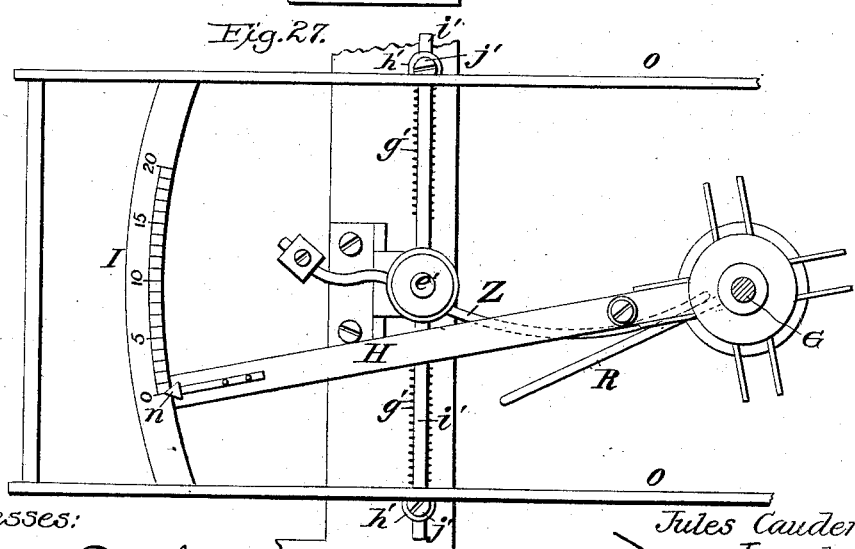

The manner of suspending the drum is best illustrated in Fig. 24, by reference to which it will be seen that the upper end of the shaft G is provided with a light open frame, $h$, which passes about the cross-bar of a frame, $i$, by which the upper pivot, $f$, of the shaft is supported, and that said frame is furnished at its upper side with an eye or loop concentric with the axis of the drum, to which eye the thread or cord is made fast.

The thread or cord $g$ is attached at its upper end to a coil-spring, $j$, carried by a screw-stem, $k$, which passes through an overhanging bracket, $l$, and is furnished with an adjusting-nut, $m$, by which the drum may be nicely adjusted so as to prevent the gudgeons or pivots from receiving weight or pressure from the drum or its shaft. This arrangement, which is closely similar to that of the torsion-balance, gives the extreme delicacy of action attained by said instrument, and causes the drum to turn readily in response to exceedingly slight variations in the strength of the current.

Projecting horizontally from the drum, to which it is hinged or jointed, is a bar, H, carrying at its outer end a pointer or index, $n$, which extends beyond and moves over but slightly above a scale-plate, I, graduated to suit the construction and adjustment of other parts of the apparatus, it being obvious that the quantity may be expressed in different units of measurement and in different divisions of time. The bar H is hinged or jointed in such manner that it may rise and fall freely within short limits, and extends over a toothed cylinder, J, and beneath a scale-plate, I, the latter resting upon the bar H and rising and falling with it. This scale-plate is carried by two bars, $o\ o$, secured to and extending horizontally from a rock-shaft, $p$, which is nicely pivoted in supporting arms or brackets $q\ q$.

Arms $r\ r$, secured to the rock-shaft $p$ and furnished with adjustable counter-weights $s\ s$, permit the weight of bar H, scale-plate I, and arms or bars $o\ o$ to be more or less nearly balanced, so that their movements may be effected by a very slight force; but the adjustment of the weights should be such as not to prevent the parts from falling with ease and certainty.

Projecting laterally from one of the bars $o$, which support the scale-plate I, is a swiveled arm by which is carried a rod, $t$, bearing two adjustable dogs or pawls, $u$ and $v$, the latter jointed so that its end may yield in riding back over the teeth of the ratchet-wheel L, which it actuates, but so, also, that it shall lock or become rigid when drawn against the upright faces of the ratchet-teeth. The weight of the rod $t$ and its pawls or dogs is nearly but not quite counterbalanced by a light spring, $w$, attached to the rear end of the rod near its pivotal point, and at its other end made fast to the main frame of the apparatus.

The relative length and adjustment of the two pawls are such that when the arms $o\ o$, and consequently the rod $t$, rise the pawls $u$ shall be lifted up from and clear of the teeth of the wheel, while pawl $v$ merely springs over the crest of a tooth and engages with the upright rear face thereof. From this it follows that when the bar H is lifted, carrying with it the frame or bars $o\ o$ and rod $t$, the pawls $u\ v$ are lifted up clear of the ratchet-wheel, the pawl $u$ engaging with a fresh tooth, and as the parts descend the wheel is rotated a distance equal to the space of one tooth, the second pawl coming into engagement with the teeth just before the movement is completed, and insuring such completion. This avoids any trouble from the possible disengagement of pawl $u$ before the movement is completed. By varying the relative positions of the pawls the movement may be varied. Backward rotation of the ratchet-wheel is prevented by a spring, $x$. (Shown in Fig. 1.)

Upon the same spindle or arbor which carries the ratchet-wheel L is a wheel, M, the rim of which is graduated into sixty equal spaces or divisions. An index, $y$, fixed to the frame of the apparatus projects over this graduated rim and the graduations are read from said index.

The graduation of wheel M into sixty divisions and the provision of the ratchet-wheel with thirty teeth are matters necessary in an apparatus measuring lamp-hours; but if it is intended to measure coulombs the rim of wheel M will be graduated into one hundred divisions, every such division corresponding to one hundred coulombs. So, too, the ratchet-wheel would in such case be provided with fifty instead of thirty teeth, and the cylinder J would be made to complete one revolution in one hundred seconds instead of in sixty seconds, as in the apparatus here illustrated. The shaft or spindle $z$, on which the wheels L and M are mounted, is further provided with a worm or screw, N, which meshes with and gives rotary motion to a pinion, $a'$, on the spindle of the first of the register-indicators, from which pinion motion is transmitted to the other indicators or pointers through the usual train of gearing, as indicated in Fig. 3.

From the foregoing description it will be seen that an alternate rising and falling movement of the index or pointer-bar H, and the consequent movement of arms $o\ o$ and rod $t$, with its pawls $u$ and $v$, will cause the actuation of the registering-train. This rising and falling movement is produced through the rotation of the toothed cylinder J, the teeth of which act successively upon or against a beveled block, $b'$, secured to the under side of the bar H, Figs. 15 and 16. As the teeth or pins of the cylinder press against this block they shift the bar H and the connected parts, and as the pins ride past the block the parts fall by force of gravity.

Figure 5:
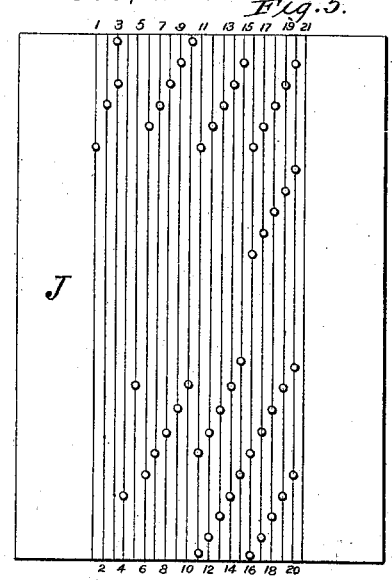
Figures 6, 7:
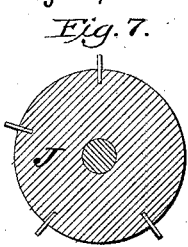
Figure 8:
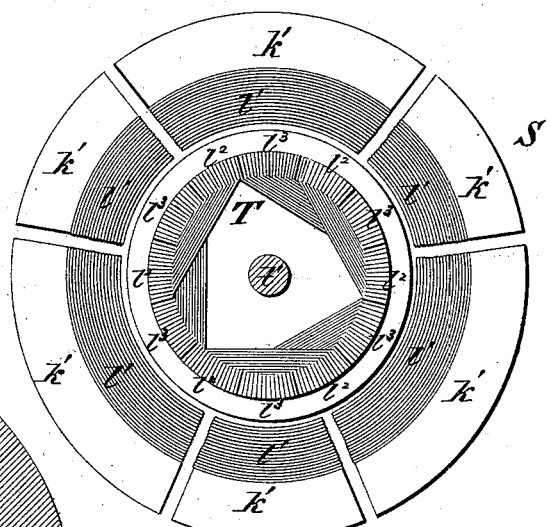

The cylinder J is encircled by twenty-one parallel lines or rows of teeth, as shown in the diagram or developed surface of Fig. 5, and the beveled block $b'$ is of a width to reach across five of these rows; hence all the teeth or pins of five rows will act to lift and drop the bar H.

The number of pins in different rows differs, consequently the number of movements of the bar H and connected parts will vary according to the position or deflection of said bar. Thus it will be seen that as variations in the current and consequent variations in the deflection of bar H occur the number of vertical movements of said bar will vary to correspond, and as the movements of the bar control the movements of the pawl-and-ratchet-actuating mechanism of the register the rate of turning of the register-indices will be in direct accord with the position of the bar H, and of course in accord with the condition of the current.

To insure exact correspondence between the variations in the current and the deflections of the indicator-bar H, a horizontal arm or lever, Z, is secured to the shaft of the moving drum F in any convenient manner, a set-screw passing through a hub formed at one end of the arm being shown in Figs. 13 and 14 of the drawings. Said arm is curved, as shown in Figs. 3, 13, and 14, its curved face forming a bearing surface for a thread or band, $c'$, one end of which is attached to the hub of the arm or lever Z, or to the arm close to said hub, and the other end of which is attached to a spring, O. This spring, which is preferably of helical form, is attached at one end to a rod, P, which passes through a post, Q, on the frame of the apparatus and is held at any desired adjustment therein by means of a set-screw, as shown in Figs. 1 and 3.

The curvature of the arm or lever Z must be determined and produced with nicety, and must be such that the distance from the axis of movement of said arm to the point at which the thread or band $c'$ meets and acts upon the same shall increase proportionally to the square of the deflection.

Projecting rearwardly from the open frame $d'$ $h$ is a rod or arm, $d'$, upon which is mounted an adjustable weight, which serves to laterally equilibrate the curved arm or lever Z and to bring the pointer-bar H back to the zero-point of scale I when no current is passing. The same result may be attained by the modified construction shown in Figs. 23 to 27, inclusive, which dispenses with the thread and thus avoids any inaccuracy that might result from hygrometric influence. As shown in said figures, the curved arm or lever Z is mounted upon a spindle, $e'$, of its own, and its hub is furnished with two radial arms, $f'$, projecting in opposite directions. To the other end of each of said arms is attached a coiled wire spring, $g'$, the opposite end of which is attached to a block, $h'$, mounted upon a rod, $i'$, to which the blocks are made fast at any desired adjustment by set-screws $j'$. By using two springs on opposite sides of the spindle $e'$, I avoid any tendency to draw the spindle sidewise, and thus obviate the increase of friction which would result therefrom.

R indicates a radial arm projecting from the shaft or spindle of the movable drum F, and extending to or nearly to the hub of curved arm or lever Z, where it bears against the curved face of the latter, said arm being curved in the same manner under this modified construction as in the construction first described. Under both arrangements the increase in leverage is only proportional to the square of the deflection; hence a given variation of the current will cause an unvarying deflection of the index or pointer.

The manner of securing a uniform rotation of cylinder J in prescribed time remains to be explained, and for this purpose reference is made to Figs. 1 to 12, inclusive, and Figs. 21 and 22.

Figure 9:
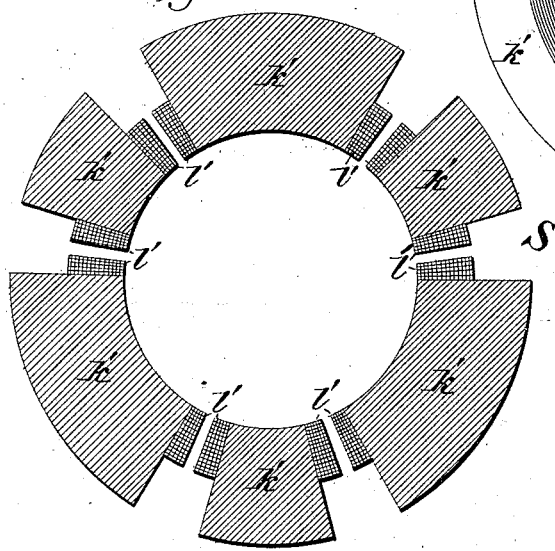
Figure 10:
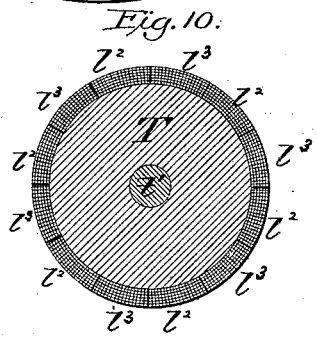
Figure 11:
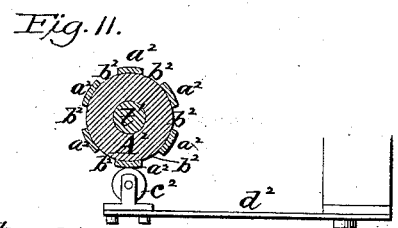
Figure 12:
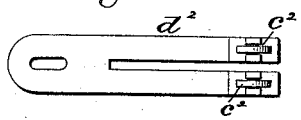

As before stated, the rotation of the cylinder is effected by means of an electromotor, D, mounted upon the base A and held in fixed relation to the dynamometer C. This motor consists of a fixed outer hollow frame or cylinder, S, and an inner rotary cylinder, T, the outer cylinder being formed of six vertical columns, $k'$, of wood, which are wound vertically with very fine wire $l'$, the winding being carried up one side face and down the other side face of each column, as indicated in Fig. 9. The hollow cylinder S is supported by two brass posts, $m'$, which are secured to baseboard A. Cylinder T is placed centrally within the hollow cylinder S, and is mounted upon posts or gudgeons $n'$, upon which the cylinder may rotate very freely. This cylinder is required to make exactly three hundred revolutions per minute, or five revolutions per second, in order that the registering mechanism, graduated as above explained, may make a proper record of the current passing. It is wound with twelve columns, $l^2$ $l^3$, of very fine wire, like that of the outer cylinder. The length of the wire must be sufficient to give at least a thousand ohms of resistance, and in case currents of very high tension are used the resistance must be much greater.

Formed or secured upon the shaft of the cylinder T is a worm, U, Figs. 1, 2, and $2^b$, which meshes with and rotates a worm-wheel, V, of thirty teeth. The worm-wheel V is made fast upon a shaft or arbor, W, which carries a pinion, $o'$, of ten teeth, which, through the medium of idler-pinion $p'$, gives motion to a wheel, $q'$, of one hundred teeth, mounted upon the arbor or shaft of cylinder J. From this arrangement it follows that if the cylinder T makes three hundred revolutions per minute the cylinder J must make one complete revolution in exactly the same time—that is, in sixty seconds.

In order to maintain the cylinder T at its proper speed of rotation, it is provided with a centrifugal or ball governor, the balls of which will be thrown and held outward from the axis of rotation so long as the requisite speed is maintained; but whenever the speed falls below that prescribed the decrease in centrifugal force will permit retracting-springs to draw the arms inward toward the axis of rotation.

The arms carry circuit-closing pieces, which, when the arms are drawn inward, complete the circuit through the coils of the motor and cause a fresh impulse to be given, and a consequent acceleration of the speed ensues. When the proper speed is again attained, the circuit is broken by the centrifugal action of the arms, and the cylinder continues to rotate by reason of its momentum until the speed lessens, the circuit is again closed, and a fresh impulse is given, as before. The construction and arrangement of this governor are illustrated in Fig. 4, in which X indicates the governor as a whole, composed of two metal arms or levers, $r'$ $r'$, each pivoted to a separate metallic plate, $s'$, which plates are fastened upon a block, Y, of suitable insulating material, carried by the shaft $t'$ of the cylinder T. Each lever $r'$ is slotted and works over a rod or stem, $u'$, projecting from block Y, and encircled by a spring, $v'$, which may be made to bear with greater or less force against the outer face of the lever by adjusting a regulating-nut, $w'$, secured upon the rod. Each lever is formed or finished with a stud, $x'$, which makes contact, when the cylinder is at rest or rotating with less than its prescribed speed, with a like stud, $x^2$, projecting from a plate, $y'$, secured upon the block Y, but is separated from the plate $s'$, to prevent passage of the current from one plate to the other. When the governor arms or levers $r'$ $r'$ make contact with the plates $y'$ $y'$, the space between the plates is bridged over and the current passes from one plate to the other through said arms or levers. The electric current to be measured enters and leaves the coils of drum or cylinder F through two spirals, $z'$ $z'$, Figs. 1, 2, and 3, formed of flat copper strips, resembling the spring of a watch, and having the same cross-section as the wire wound upon the drum or cylinder. This provision permits the current to pass with equal facility under all variations in the position of the drum or cylinder, and offers no appreciable resistance to the movements of the drum. The shaft $t'$ of cylinder T carries two commutator cylinders or spools, A' B', consisting of alternate conducting and non-conducting strips or portions, $a^2$ $b^2$, the conducting-strips of one alternating with the non-conducting-strips of the other. The current passes to and from the commutators by metallic rollers $c^2$, carried by spring-arms $d^2$, of metal, secured to the wooden frame of the outer cylinder, S, each spring-arm being divided to give greater elasticity and to enable the separate rollers to bear upon and adapt themselves to the surface of the commutator-cylinders independently of each other. By employing the two commutator-cylinders and alternating the metal strips of one with those of the other a path is at all times furnished for the electric current. The rollers do not produce the friction attending the use of brushes, and hence do not appreciably retard the rotation of the cylinder.

With the machine constructed as above described—that is to say, with six columns wound with wire in the manner shown—the commutator-rollers by which the current enters and leaves the cylinders are arranged diametrically opposite each other; but I may in some instances employ but four columns, in which case I prefer to dispose the rollers at intervals of ninety degrees. This arrangement is of great importance to the correct working of the register. Thus constructed and arranged, the following circuit-connections are made, reference being made to Figs. 1, 2, and 3 and to the diagrams, Figs. 21 and 22, the former relating to the dynamometer and the latter to the motor: In the first of these diagrams $d\ d\ d\ d$ indicate the four coils of the fixed frame of the dynamometer C; $e\ e\ e\ e$, the four coils of the movable frame; $z'$ $z'$, the spirals, and C' D', the poles or terminals. The full line indicates the current which passes through the two sets of coils, and the broken or dotted lines represent the two currents, one for the fixed frame and the other for the movable drum.

In Fig. 22 $l'$ indicates the wire columns of the fixed outer frame, S, of the motor, and $l^2$ $l^3$ the twelve wire columns of the rotary cylinder T, further distinguished in said figure by black and white circles. The white circles $a^3$ indicate the six plates of the lower collector connecting with the white coils $l^2$, and the black circles $a^2$ indicate the six plates of the upper collector connected with the group of black coils $l^3$. The circuit-closing arms of the governor are indicated by the letter $r'$, as in other figures, and $c^2$ indicates the collecting-rollers carried by the spring-arms $d^2$. E and F indicate the poles or terminals. The heavy full-drawn line indicates the current that flows through the wire of the fixed outer frame, S. The lighter full-drawn line indicates the current of one of the groups of the movable frame or cylinder T. The broken line indicates that of the other group. The current may enter and leave through any of the binding-posts 5 6 7 8 on the platform A of the apparatus.

In the drawings the current is supposed to enter at the binding-post 5, Figs. 1, 2, and 3, whence it passes through the wire $e^2$ to the top of one of the columns of the fixed frame of the dynamometer C, thence down along the first column, up the second, down the third, to the top of the fourth column. From the last-named point the current passes by a wire, $e^3$, to a brass bracket, which is connected at its lower part with the end of the lower spiral, $z'$. This spiral transmits the current to the bottom of the first column of the movable drum F. Passing up the first, down the second, up the third, and down the fourth, the current is conducted by means of an inner wire to the upper spiral, $z'$, which is connected with a brass bracket in electric communication with the lamps by means of a wire, $e^4$.

According to the principles stated at the outset the effect of the current passing alternately up and down the columns of the fixed and movable frames of the dynamometer will be to cause the movable frame or drum to approach those columns of the fixed frame where the current has the same direction. And this motion, the amount of which will depend upon the force of the current, will affect the pointer H, which by its deflection will indicate the position of the movable frame or drum F.

The main conductor entering at the binding-post 5 sends, by means of another wire, $e^5$, a derived current to the top of the first outer column of fine wires belonging to the fixed frame S of the electromotor. This current, after passing down the first column, up the second, and so on to the top of the sixth, is finally conducted back to the main line that leads to the binding-post 6 by means of the wire $e^6$, Figs. 2 and 3. Another wire, $e^7$, branched off from $e^5$ at its point of entrance into the fixed frame S, leads the current to the roller-supports $d^2$ in front of the collectors $a^2$ $a^3$, to which the current is thus transmitted, to be by them directed to movable frame or cylinder T. This frame or cylinder being composed, as mentioned above, of twelve columns of very fine wire, is divided into two distinct circuits of six alternate columns each—one of these circuits connected with or including the collector $a^2$ and the other connected with or including the collector $a^3$—so that their alternate action produces a continuous effect. The current of the collector $a^2$ passes through all columns of uneven number from the top to the bottom, and after leaving the eleventh column returns to the same collector from which it started, whence it passes through the rollers $c^2$ and their support $d^2$ back of the collector to be finally led to the binding-post 6. The current of the lower collector, $a^3$, after passing over the wire of the columns of even number from the bottom to the top, leaves the twelfth column, returns to its collector, and leaves it by means of the roller-supports behind this collector to return to the wire leading to the binding-post 6. The governor is inserted in the wire that connects each of the commutators with its respective circuit in the movable frame. The current enters the two plates $s'$ $s'$, passes through the hinged ball-arms $r'$ $r'$, and is thus led to the contact-pieces $x'$ $x'$. On the other hand, the two plates $y'$ $y'$, with their contact-pieces $x^2$ $x^2$, arranged opposite the pieces $x'$ $x'$, are in permanent connection with the opposite pole. Consequently whenever the pieces $x'$ $x'$ and $x^2$ $x^2$ come into contact the circuit is closed and the current thus established renews the energy of the current impelling the motion of the movable frame or cylinder T until the latter regains its normal rate of speed. While thus the current enters at the binding-post 5 and leaves at the binding-post 6 the lamps or other work will be introduced between binding-posts 7 and 8. Thus the currents derived from the main current co-operate in producing the motion of the motor and increasing its energy when diminished, and contribute by means of the governor to give the necessary regularity, so that the cylinder may perform its revolutions exactly in the prescribed time.

Regarding the dynamometer, the apparatus as here represented is intended for a maximum of twenty ampères; but a current of double intensity might be measured by the same apparatus, or a double value be given to every one of the scale-divisions by splitting the current in two—that is to say, by bringing the fixed and movable frames separately into the circuit, as this would give a double section and would diminish the resistance accordingly.

I do not wish to be restricted to the precise details of construction above described, many of which are of secondary importance and may be modified as circumstances may suggest or require. Nor do I wish to always combine the two principal parts of the apparatus, since the registering mechanism with its dynamometric motor may under certain circumstances be combined with a magnet-amperometer or other like device, while the electro-dynamometer may be used in combination with registering mechanisms of different patterns.

Having thus described my invention, what I claim is—

1. The herein-described apparatus for measuring alternating electric currents, consisting in a fixed and a movable frame, each wound with wire in groups or columns, those of one frame extending between and alternating with those of the other, a pointer carried by the movable frame, a curved bar or lever connected directly or indirectly with the movable frame, a cord or band lying against the curved face of the bar, a spring connected at one end to the cord or band and at the other end to a fixed support, a scale-plate in proximity to the pointer, an electromotor, a governor applied to said motor and serving to open or close its actuating-circuit as the speed rises or falls above or below the normal rate, a toothed cylinder rotated by said motor and serving to lift the pointer, the scale-plate, and its supporting-frame as the teeth ride beneath the pointer, a registering-train, and a pawl carried by the scale-supporting frame and serving to impart motion to the train as said frame is lifted and dropped by the teeth of the cylinder.

2. In an electric-current meter, the combination of a fixed and a movable frame wound with parallel groups or columns of wire, a scale-plate, a pointer carried by the movable frame and extending to said scale-plate, a curved arm or lever connected and moving in harmony with the movable frame, a cord or band lying against the curved face of the arm or lever, and a spring attached at one end to a fixed support and at the other end to the cord or band, said parts being constructed and arranged to operate substantially as set forth, whereby the spring is caused to offer resistance increasing in proportion to the deflection of the pointer.

3. In combination with fixed and movable wire-wound frames having their windings alternated, and with a pointer carried by the movable frame, a curved arm connected and moving in concert with the movable frame, and a spring connected with the curved arm and exerting its force upon the same at varying distance from the center of motion thereof, substantially as and for the purpose set forth.

4. The herein-described electric meter, consisting of dynamometer C, pointer-bar carried by the movable drum thereof, curved bar Z, a spring acting upon said bar and tending to hold it and the pointer against deflection, a register, a ratchet-wheel, L, connected with and serving to give motion to the register, toothed cylinder J, extending beneath the pointer-bar, a scale-plate, I, above the pointer-bar, carried by arms $o$, a rod, $t$, carried by one of said arms, a pawl carried by rod $t$ and serving to rotate wheel L, an electromotor connected with and serving to rotate cylinder J, and a governor applied to the motor and serving to maintain an unvarying rate of speed therein.

5. In an apparatus for measuring an alternating electric current, a fixed and a movable frame composed of wire-wound columns, those of one frame extending into the space between those of the other, both connected with and supplied by the same current, and a pointer carried by the movable frame and serving to show by its deflection the condition of the current passing.

6. In an electric meter, the combination of the electro-dynamometric apparatus C, pointer H, thread or band $c'$, spring O, and curved lever Z, said parts being constructed and arranged to operate substantially as described and shown, whereby the deflections of the pointer are made proportional to the intensity of the current measured.

In testimony whereof I affix my signature in presence of two witnesses.

JULES CAUDERAY.

Witnesses:
G. DE MESTRAL,
ROBT. M. HOOPER.